(12) United States Patent
Sato (10) Patent No.: US 8,493,490 B2
(45) Date of Patent: *Jul. 23, 2013

(54) IMAGING APPARATUS AND CAMERA

(75) Inventor: Hiroki Sato, Kanagawa (JP)

(73) Assignee: Sony Corporation (JP)

( * ) Notice: Subject to any disclaimer, the term of this patent is extended or adjusted under 35 U.S.C. 154(b) by 97 days.

This patent is subject to a terminal disclaimer.

(21) Appl. No.: 13/155,784

(22) Filed: Jun. 8, 2011

(65) Prior Publication Data

US 2011/0234874 A1    Sep. 29, 2011

Related U.S. Application Data

(62) Division of application No. 11/952,315, filed on Dec. 7, 2007, now Pat. No. 7,995,126.

(30) Foreign Application Priority Data

Dec. 18, 2006 (JP) .................................. 2006-339415

(51) Int. Cl.
   *H04N 5/335* (2011.01)
   *H04N 9/64* (2006.01)
(52) U.S. Cl.
   USPC ............................ 348/308; 348/246; 341/110
(58) Field of Classification Search
   USPC .......... 348/246–250, 294, 301, 308; 341/110, 341/126, 136, 144
   See application file for complete search history.

(56) References Cited

U.S. PATENT DOCUMENTS

| 6,344,877 | B1 * | 2/2002 | Gowda et al. ................. 348/245 |
| 6,943,720 | B2 * | 9/2005 | Nakamori et al. ............ 341/156 |
| 7,135,680 | B2 * | 11/2006 | Elkind et al. .................. 250/332 |
| 7,492,394 | B2 * | 2/2009 | Mentzer ..................... 348/229.1 |
| 7,511,754 | B2 * | 3/2009 | Scott-Thomas et al. ...... 348/302 |
| 7,571,754 | B2 | 8/2009 | Ushijima |
| 2005/0099516 | A1 | 5/2005 | Kagle et al. |
| 2011/0234874 | A1 * | 9/2011 | Sato .............................. 348/301 |

FOREIGN PATENT DOCUMENTS

| JP | 06-189199 | 7/1994 |
| JP | 2000-236485 | 8/2000 |
| JP | 2002-209149 | 7/2002 |
| JP | 2006-186467 | 7/2006 |
| JP | 2006-340044 | 12/2006 |

* cited by examiner

*Primary Examiner* — Trung Diep
(74) *Attorney, Agent, or Firm* — Sheridan Ross, P.C.

(57) ABSTRACT

An imaging apparatus including a pixel, a current source, and a signal processing circuit. The pixel outputs signal charge, obtained by imaging, as a pixel signal. The current source is connected to a transmission path for the pixel signal and has a variable current. The signal processing circuit performs signal processing on a signal depending on an output signal to the transmission path and performs control so that a current of the current source is changed in accordance with the result of signal processing.

12 Claims, 11 Drawing Sheets

| HSIG | INITIAL STATE | 0 | 1 |
|---|---|---|---|
| ISEL1 | H | H | H |
| ISEL2 | H | L | H |
| ISEL3 | L | L | H |

IMAGING APPARATUS AND CAMERA

RELATED APPLICATION DATA

This application is a division of U.S. patent application Ser. No. 11/952,315, filed Dec. 7, 2007, the entirety of which is incorporated herein by reference to the extent permitted by law. The present application claims the benefit of priority to Japanese Patent Application No. JP 2006-339415 filed in the Japanese Patent Office on Dec. 18, 2006, the entirety of which is incorporated by reference herein to the extent permitted by law.

BACKGROUND OF THE INVENTION

The present invention relates to an imaging apparatus having column-parallel analog-to-digital converters and a camera including the imaging apparatus.

In many cases, typical solid-state imaging apparatuses, each having column-parallel analog-to-digital converters, include counter-ramp analog-to-digital converters utilizing single-slope integration.

Figure 1:
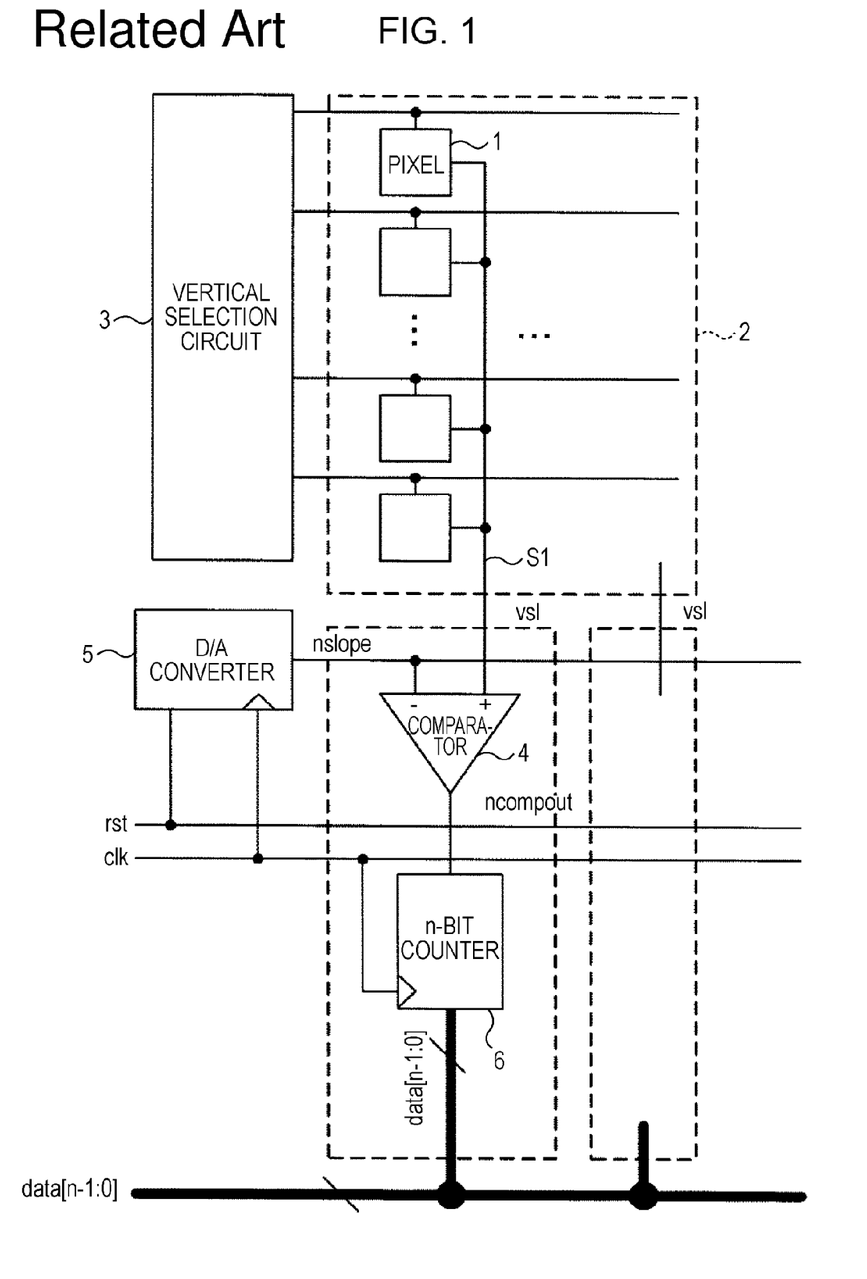
FIG. 1 is a diagram illustrating the structure of an imaging apparatus having counter-ramp analog-to-digital converters utilizing single-slope integration.

FIG. 1 illustrates the structure of an imaging apparatus having counter-ramp analog-to-digital converters utilizing single-slope integration.

Figure 2:
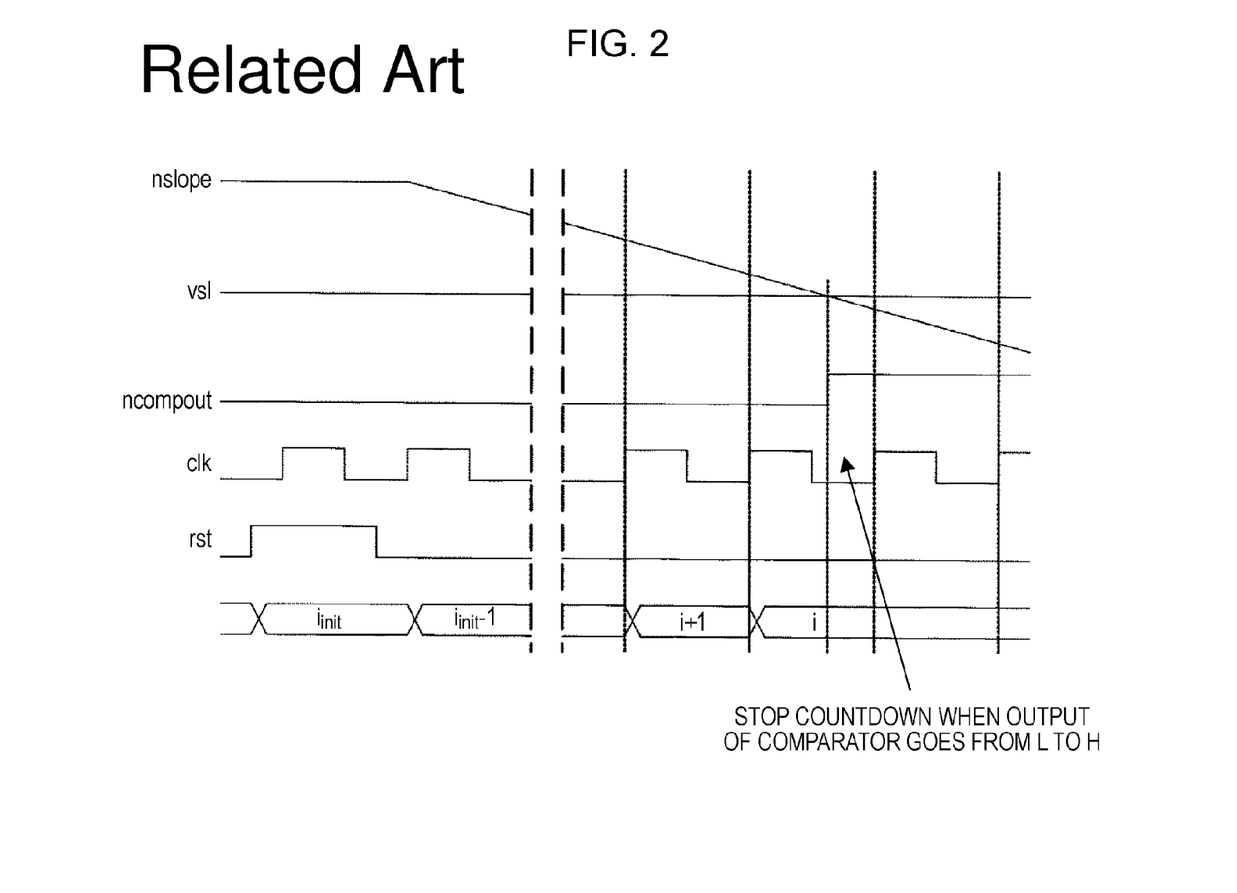
FIG. 2 is a timing chart explaining the operation of the apparatus in FIG. 1.

FIG. 2 is a timing chart explaining the operation of the apparatus in FIG. 1.

The operation of the apparatus in FIG. 1 will now be described in relation to the timing chart of FIG. 2.

Unit pixels 1 for photoelectrically converting external light into electrical signals are arranged in a matrix to constitute a pixel array 2. It is assumed that a vertical selection circuit 3 selects a certain row in the pixel array 2.

A pixel in the selected row outputs a pixel signal (hereinafter, a pixel output signal S1) through a vertical signal line vsl extending along the columns of the pixel array 2. The vertical signal line vsl is connected to one input terminal (positive terminal) of a comparator 4 disposed for each column. The other terminal (negative terminal) of the comparator 4 receives an output signal nslope from a digital-to-analog (D/A) converter 5, the output signal being an analog signal obtained in response to a clock signal clk.

It is assumed that when the pixel output signal S1 transmitted through the vertical signal line vsl is lower in level than the output signal nslope of the D/A converter 5, an output signal ncompout of the comparator 4 becomes low ("L"), whereas when the pixel output signal S1 of the vertical signal line vsl is higher in level than the output signal nslope of the D/A converter 5, the output signal ncompout of the comparator 4 becomes high ("H").

The output signal ncompout of the comparator 4 is supplied to an n-bit counter 6. The n-bit counter 6 increases or decreases a count value in response to the clock signal clk. FIG. 2 shows a case where the count value decreases by one.

The n-bit counter 6 resets its count value to an initial value $i_{init}$ in response to a reset signal rst. When the output signal ncompout of the comparator 4 becomes high, the n-bit counter 6 stops increasing or decreasing the count value and holds the count value (denoted by "i" in FIG. 2).

This count value is output as n-bit output data [n−1:0] from the n-bit counter 6. The output of the n-bit counter 6 and outputs of other counters in other columns are sequentially output.

SUMMARY OF THE INVENTION

In the counter-ramp analog-to-digital converters utilizing single-slope integration as shown in FIG. 1, disadvantageously, conversion time or a clock frequency has to be increased in order to increase the accuracy of analog-to-digital conversion.

For example, the number of clocks required for A/D conversion of n bits is $2^n-1$ cycles. When n bits are extended to n+1 bits, the number of clocks required is $2^{n+1}-1$ cycles, which is substantially twice the $2^n-1$ cycles.

To achieve the increase in the number of clocks required, the conversion time or the clock frequency has to be increased by a factor of approximately two. Disadvantageously, increasing the conversion time prevents high speed operation for realizing a high frame rate or processing an increased number of pixels. Unfortunately, increasing the clock frequency results in an increase in power consumption or requires an improvement of the accuracy of elements.

Furthermore, in the counter-ramp analog-to-digital converters utilizing single-slope integration, disadvantageously, a variation in threshold level Vth of a comparator or the accuracy of voltage output from a digital-to-analog converter affects the accuracy of the analog-to-digital converter.

In other words, assuming that a pixel output signal has an amplitude of 1 V, serving as the difference between dark and light levels, an accuracy of $1/(2^n-1)$ V is required for analog-to-digital conversion of n bits.

For example, when n=14 (bits), $1/(2^{14}-1)=61$ µV. Since a variation in threshold Vth of a comparator is generally on the order of several millivolts, it is difficult to realize high-accuracy analog-to-digital conversion.

It is desirable to provide a high-resolution high-accuracy imaging apparatus capable of achieving high speed operation for realizing a high frame rate or processing an increased number of pixels without causing an increase in power consumption and requiring an improvement of the accuracy of elements.

According to a first embodiment of the present invention, an imaging apparatus includes the following elements. A pixel outputs signal charge, obtained by imaging, as a pixel signal. A current source having a variable current is connected to a transmission path for the pixel signal. A signal processing circuit performs signal processing on a signal depending on an output signal to the transmission path and performs control so that a current of the current source is changed in accordance with the result of signal processing.

Preferably, the pixel includes an amplifier transistor constituting a source follower that outputs signal charge as a pixel signal to the transmission path. The current source includes a plurality of load transistors and a plurality of switches. The gates of the load transistors are biased using a predetermined bias signal and the sources thereof are connected in parallel to a predetermined potential. Each switch is connected between the drain of the corresponding load transistor and the transmission path. The signal processing circuit selectively turns on the switches in the current source in accordance with the result of processing on the pixel signal transmitted through the transmission path.

Preferably, the pixel includes an amplifier transistor constituting a source follower that outputs signal charge as a pixel signal to the transmission path. The current source includes a load transistor and a plurality of switches. The source of the load transistor is connected to a predetermined potential. The switches are connected to the gate of the load transistor and are connected to different bias-signal supply lines, respectively. The signal processing circuit selectively turns on the switches in the current source in accordance with the result of processing on the pixel signal transmitted through the transmission path.

Preferably, the signal processing circuit includes an integrator that integrates a pixel signal transmitted through the transmission path, a quantizer that quantizes an output signal of the integrator, and a selector that changes a current of the current source in accordance with the result of quantization by the quantizer.

Preferably, the signal processing circuit includes an integrator that integrates a pixel signal transmitted through the transmission path, a quantizer that quantizes an output signal of the integrator, and a selector that selectively turns on the switches in the current source in accordance with the result of quantization by the quantizer.

Preferably, the quantizer compares the level of an integrated signal obtained by the integrator with a predetermined threshold level and outputs the result of comparison to the selector. The selector changes a current of the current source so that when the level of the integrated signal is higher than the threshold level, the level of the transmission path is lowered, and when the level of the integrated signal is lower than the threshold level, the level of the transmission path is raised.

Preferably, the quantizer compares the level of an integrated signal obtained by the integrator with a predetermined threshold level and outputs the result of comparison to the selector. The selector selectively turns on the switches in the current source so that when the level of the integrated signal is higher than the threshold level, the level of the transmission path is lowered, and when the level of the integrated signal is lower than the threshold level, the level of the transmission path is raised.

Preferably, the transmission path includes a pixel output signal line that is connected to the source of the amplifier transistor in the pixel and is connected to the current source.

Preferably, the transmission path includes a pixel output signal line and a source follower transistor. The pixel output signal line is connected to the source of the amplifier transistor in the pixel. The gate of the source follower transistor is connected the pixel output signal line and the source thereof is connected to the current source.

According to a second embodiment of the present invention, an imaging apparatus includes the following elements. A pixel array includes a plurality of pixels arranged in a matrix, each pixel outputting signal charge, obtained by imaging, as a pixel signal. A plurality of pixel signal processing units are arranged for respective columns of the pixel array. Each pixel signal processing unit includes a current source and a signal processing circuit. The current source is connected to a transmission path for the pixel signal and has a variable current. The signal processing circuit performs signal processing on a signal depending on an output signal to the transmission path and performs control so that a current of the current source is changed in accordance with the result of signal processing.

According to a third embodiment of the present invention, a camera includes an imaging apparatus and an optical system that forms a subject image on the imaging apparatus. The imaging apparatus includes the following elements. A pixel array includes a plurality of pixels arranged in a matrix, each pixel outputting signal charge, obtained by imaging, as a pixel signal. A plurality of pixel signal processing units are arranged for respective columns of the pixel array. Each pixel signal processing unit includes a current source and a signal processing circuit. The current source is connected to a transmission path for the pixel signal and has a variable current. The signal processing circuit performs signal processing on a signal depending on an output signal to the transmission path and performs control so that a current of the current source is changed in accordance with the result of signal processing.

According to the embodiments of the present invention, the signal processing circuit performs predetermined processing on a pixel signal, serving as signal charge obtained by imaging.

The level of the transmission path is controlled so that a current of the current source is changed in accordance with the result of signal processing.

According to the embodiments of the present invention, a high-resolution high-accuracy imaging apparatus capable of achieving high speed operation for realizing a high frame rate or processing an increased number of pixels without causing an increase in power consumption and requiring an improvement of the accuracy of elements and a camera including the imaging apparatus can be realized.

DESCRIPTION OF THE PREFERRED EMBODIMENTS

An embodiment of the present invention will now be described with reference to the drawings.

Figure 3:
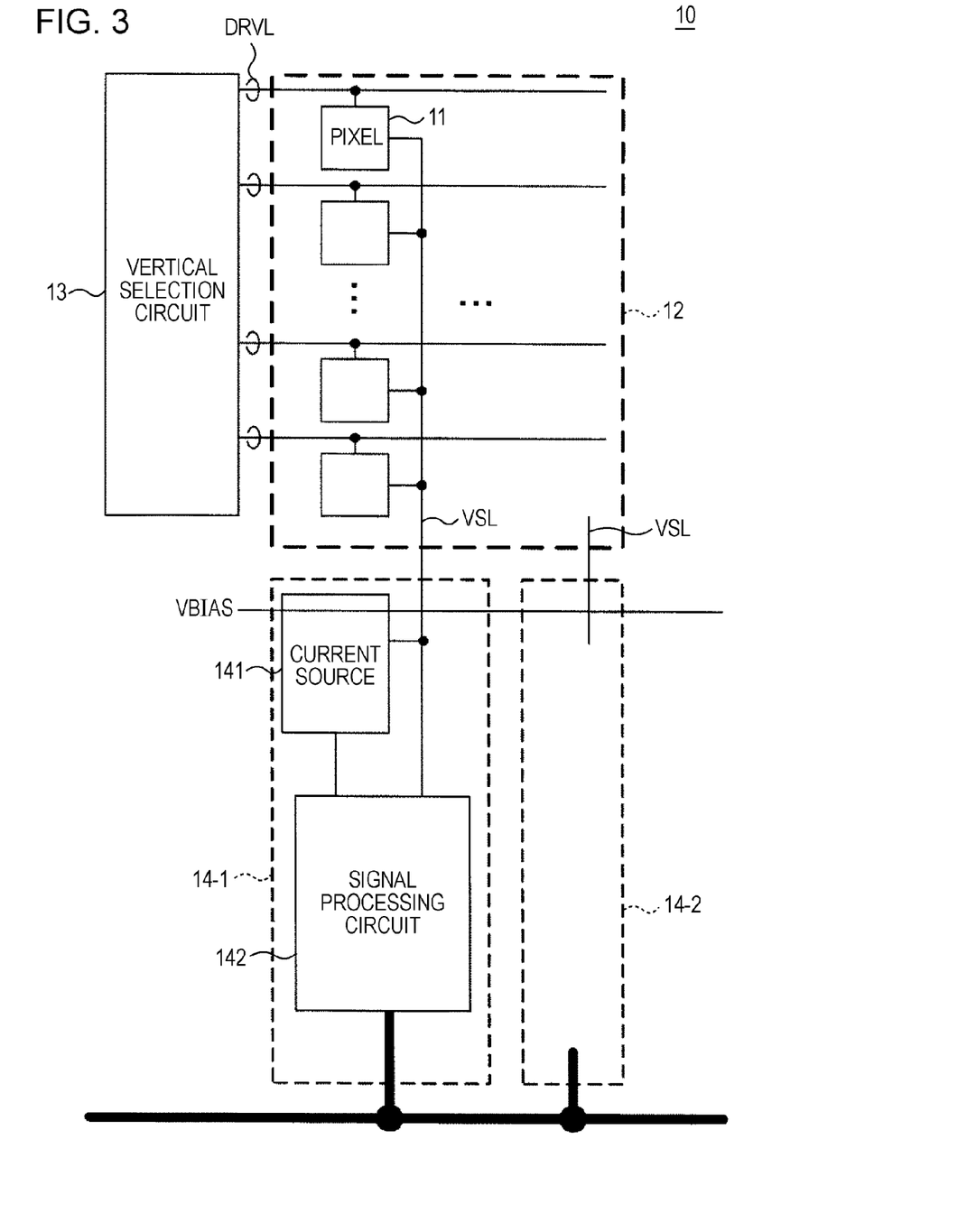
FIG. 3 is a block diagram illustrating the schematic structure of an imaging apparatus according to an embodiment of the present invention.

FIG. 3 is a block diagram illustrating the schematic structure of an imaging apparatus according to the present embodiment.

Figure 4:
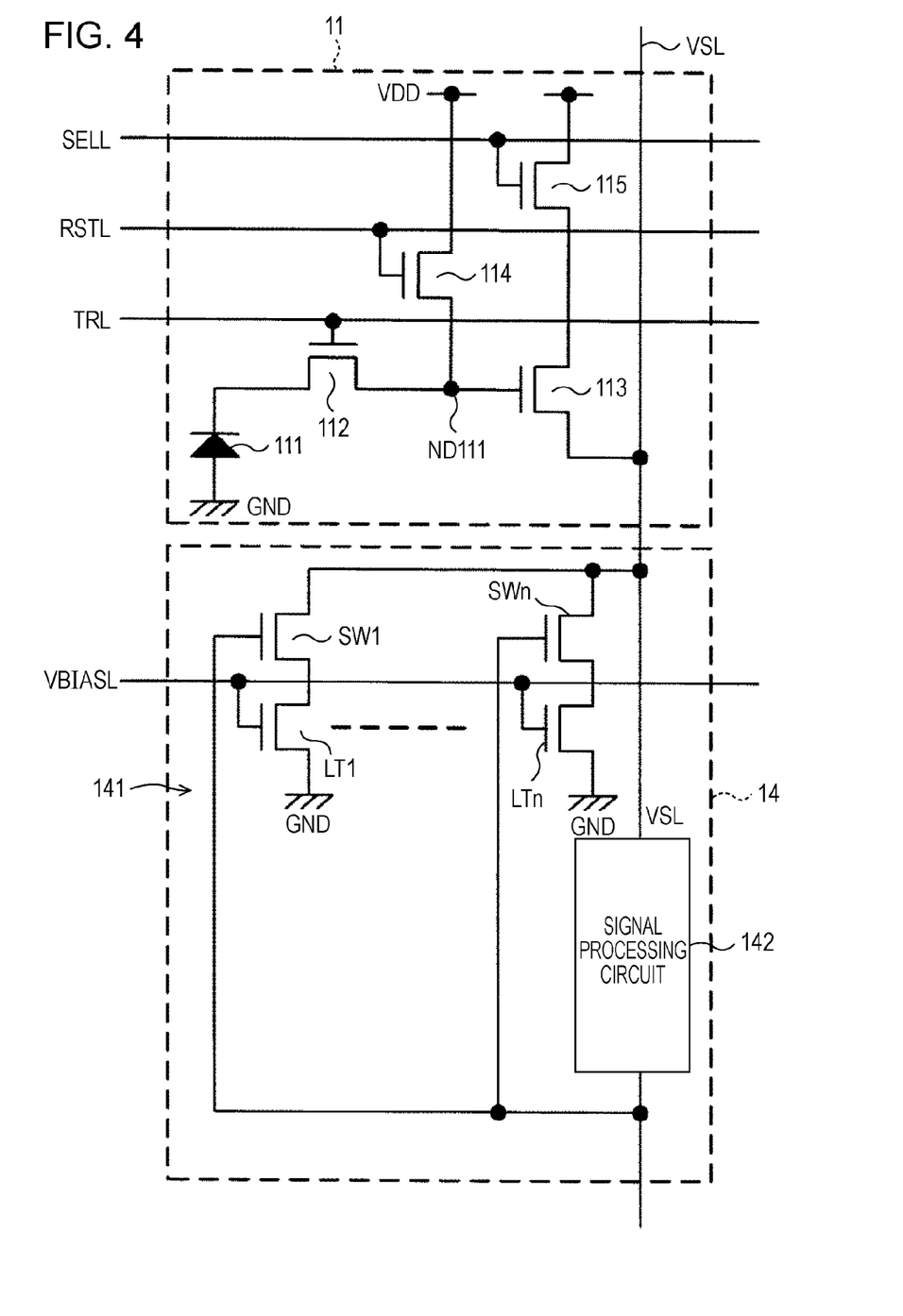
FIG. 4 is a diagram showing the structure of a unit pixel and that of a pixel signal processing unit according to the embodiment of the present invention.

FIG. 4 is a diagram illustrating the structure of a unit pixel and that of a pixel signal processing unit according to the present embodiment.

The imaging apparatus 10 includes a pixel array 12, a vertical selection circuit 13, and a plurality of pixel signal processing units 14 (14-1, 14-2, . . . ). The pixel array 12 is composed of a plurality of unit pixels 11 arranged in a matrix. Each unit pixel 11 photoelectrically converts external light into an electrical signal. The vertical selection circuit 13 selects a predetermined row of the pixel array 12 and drives a plurality of drive lines DRVL connected to the unit pixels. Each pixel signal processing unit 14 is connected directly (or through a source follower transistor) to a pixel output signal line VSL, constituting a transmission path arranged for each column of the pixel array 12.

Each unit pixel 11 includes a photodiode 111, a transfer transistor 112, an amplifier transistor 113, a reset transistor 114, and a selection transistor 115.

The photodiode 111 converts incident light into signal charge (for example, electrons), whose amount corresponds to the amount of the incident light, and stores the signal charge.

The source of the transfer transistor 112 connected to the cathode of the photodiode 111, the drain thereof is connected to a floating node ND111, and the gate thereof is connected to a transfer selection line TRL through which a transfer signal TR is transmitted. The transfer transistor 112 has a function of transferring the signal charge stored in the photodiode 111 to the floating node ND111 when conducting (turning on).

The source of the amplifier transistor 113 is connected to the pixel output signal line VSL, the drain thereof is connected to the source of the selection transistor 115, and the gate thereof is connected to the floating node ND111. The drain of the selection transistor 115 is connected to a power supply voltage source VDD and the gate thereof is connected to a selection line SELL.

The amplifier transistor 113 has a function of outputting the potential of the floating node ND111 to the pixel output signal line VSL when the vertical selection circuit 13 supplies a high-level selection signal SEL to the selection line SELL to turn on the selection transistor 115.

The drain of the reset transistor 114 is connected to the power supply voltage source VDD, the source thereof is connected to the floating node ND111, and the gate thereof is connected to a reset line RSTL. When the vertical selection circuit 13 supplies a high-level reset signal RST to the reset line RSTL, the reset transistor 114 turns on, thus resetting the potential of the floating node ND111.

The unit pixels 11 with the above-described structure are arranged in a matrix to form a pixel area (imaging area). The transfer selection line TRL, the selection line SELL, and the reset line RSTL are arranged for each row of the pixel array 12.

The vertical selection circuit 13 drives the transfer selection lines TRL, the selection lines SELL, and the reset lines RSTL.

Each pixel signal processing unit 14 includes a current source 141 and a signal processing circuit 142. The current source 141 and the signal processing circuit 142 are connected to the corresponding vertical signal line VSL extending from the pixel array 12. Referring to FIG. 4, each pixel signal processing unit 14 further includes n (n is a positive integer of two or more) load MOS transistors LT1 to LTn and n switching transistors SW1 to SWn. At least one of the load MOS transistors LT1 to LTn is selectively connected to the amplifier transistor 113 in the unit pixel 11 through the pixel output signal line VSL and the corresponding switching transistor. The amount of drive current (hereinafter, the drive current amount) of the connected load MOS transistor is controlled in accordance with an output obtained by signal processing through the signal processing circuit 142 (quantizer).

In the current source 141, the gate of each of the load MOS transistors LT1 to LTn is connected to a bias-signal supply line VBIASL through which a bias signal VBIAS is supplied. The load MOS transistors LT1 to LTn each function as a constant current source.

The source of the load MOS transistor LT1 is connected to a reference potential (ground potential GND in the present embodiment) and the drain thereof is connected to the source of the MOS switch (MOS transistor) SW1. The drain of the MOS switch SW1 is connected to the pixel output signal line VSL.

Similarly, the source of the load MOS transistor LTn is connected to the reference potential (the ground potential GND in the present embodiment) and the drain thereof is connected to the source of the MOS switch (MOS transistor) SWn. The drain of the MOS switch SWn is connected to the pixel output signal line VSL.

The gates of the respective MOS switches SW1 to SWn are connected to a control output of the signal processing circuit 142.

In the imaging apparatus 10 according to the present embodiment, each pixel signal processing unit 14 feeds a digital value, serving as an output of the signal processing circuit 142, back to the current source 141 every pixel signal to realize a function equivalent to that of a $\Delta\Sigma$ analog-to-digital converter capable of achieving high-accuracy analog-to-digital conversion.

Specifically, in column-parallel $\Delta\Sigma$ analog-to-digital converters provided for the solid-state imaging apparatus, the feedback of the output of each quantizer is realized by changing a current of the load MOS transistor, constituting a source follower connected to the pixel output signal line. Consequently, the solid-state imaging apparatus with high resolution and high accuracy is realized.

The basic structure of the $\Delta\Sigma$ analog-to-digital converter and the characteristic structure of the pixel signal processing unit 14 according to the present embodiment will now be described in more detail below.

Figure 5:
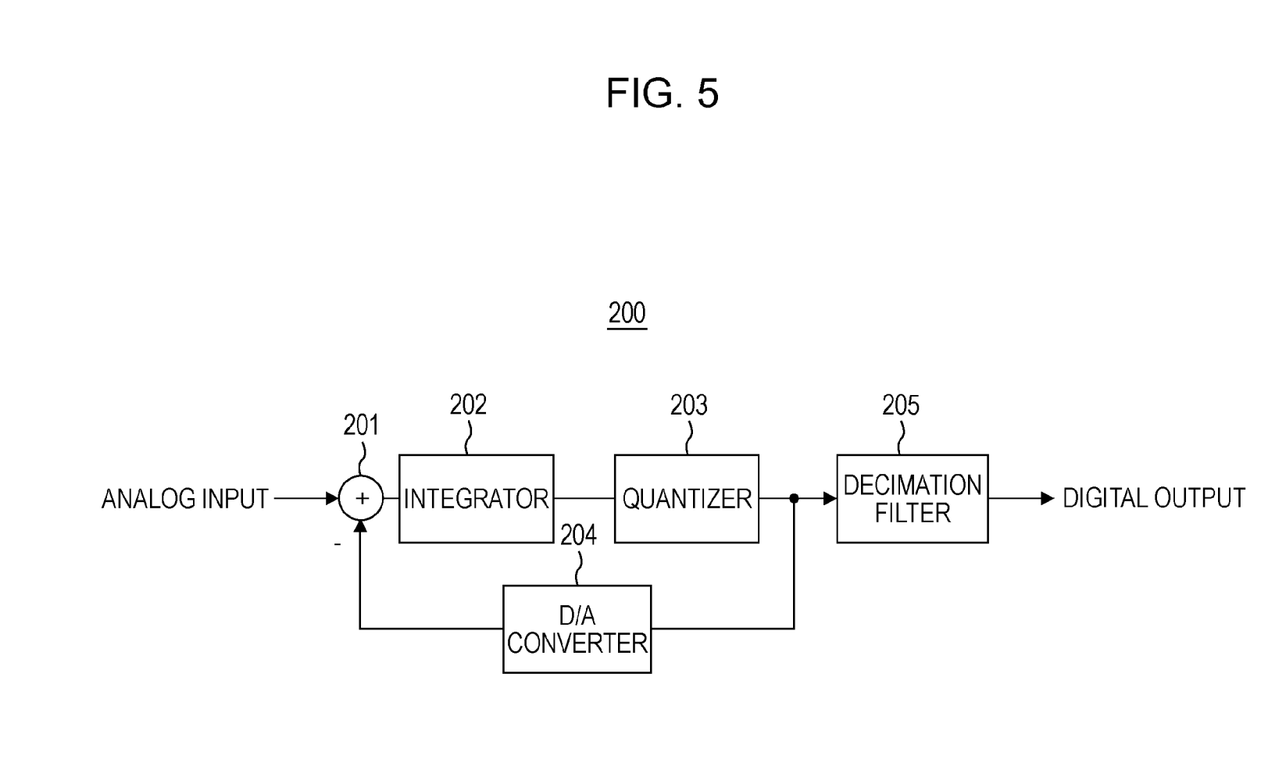
FIG. 5 is a block diagram illustrating the basic structure of a delta-sigma ($\Delta\Sigma$) analog-to-digital converter.

FIG. 5 is a block diagram illustrating the basic structure of a $\Delta\Sigma$ analog-to-digital converter.

Referring to FIG. 5, the $\Delta\Sigma$ analog-to-digital converter 200 includes a subtractor 201, an integrator 202, a quantizer 203, a digital-to-analog converter 204, and a decimation filter 205.

The integrator 202 functions as a low-pass filter (LPF). The quantizer 203 has a function of adding quantization noise (i.e., a function of differentiating to determine whether a value is set to "1" or "0"). The digital-to-analog converter 204 has a differentiating function.

In applications other than those to solid-state imaging apparatuses, e.g., in audio applications and applications to measuring instruments, $\Delta\Sigma$ analog-to-digital converters are used as analog-to-digital converters for achieving high accuracy in many cases. A conversion accuracy exceeding 16 bits is achieved.

The $\Delta\Sigma$ analog-to-digital converter 200 fundamentally includes the integrator 202 and the quantizer 203 as shown in FIG. 5. The subtractor 201 subtracts a feedback signal, obtained by digital-to-analog converting an output of the quantizer 203 through the digital-to-analog converter 204, from an analog input signal. After that, the integrator 202 integrates a signal output from the subtractor 201, the quantizer 203 quantizes a signal output from the integrator 202, and the decimation filter 205 decimates a signal output from the quantizer 203, thereby obtaining a digital output signal.

The $\Delta\Sigma$ analog-to-digital converter 200 can achieve high-accuracy analog-to-digital conversion. To apply the high-accuracy analog-to-digital conversion to a solid-state imaging apparatus, a digital value has to be fed back for each pixel signal. It is difficult to realize the feedback.

In the present embodiment, the above-described feedback is realized by arranging the constant current sources including the MOS transistors (n-channel MOS transistors in the present embodiment), which are connected to the amplifier transistor in each unit pixel 11 to constitute a source follower circuit, and changing a current of the constant current sources in accordance with an output of the source follower circuit or an output of the signal processing circuit 142 arranged in the subsequent stage, the output of the circuit 142 being based on the output of the source follower circuit.

Again referring to FIG. 4, as described above, the pixel signal processing unit 14 is connected to the pixel output signal line VSL extending from the pixel such that the load MOS transistors LT1 to LTn are connected to the amplifier transistor 113 in the unit pixel 11 via the pixel output signal line VSL through the switching transistors (MOS switches) SW1 to SWn, respectively. The drive current amount of the load MOS transistors is controlled in accordance with an output of the quantizer in the signal processing circuit 142.

Specifically, in the pixel signal processing unit 14 in FIG. 4, each of the MOS switches SW1 to SWn is disposed between the corresponding one of the load MOS transistors LT1 to LTn and the pixel output signal line VSL. Turning on and off the MOS switches SW1 to SWn changes the number of the load MOS transistors LT connected to the pixel output signal line VSL.

A change in voltage of the pixel output signal line VSL according to the load MOS transistors LT is expressed by the following Expression 1. When let $I_{load}$ be the drive current amount of the load MOS transistors LT, let $V_{PIXEL}$ be a pixel signal voltage, and let $V_{TH}$ be a threshold level of the amplifier transistor 113, the current drive amount $I_{load}$ changes depending on a voltage $V_{PIXEL}-V_{TH}$. Consequently, an output of the quantizer can be fed back.

$$V_{VSL} = V_{PIXEL} - V_{TH\cdot amp} - \sqrt{\left|\frac{2I_{load}}{\mu_0 C_{ox} \frac{W}{L}}\right|} \quad \text{Expression 1}$$

where $\mu$ denotes the mobility of carrier, $C_{ox}$ denotes the gate capacitance per unit area, W denotes the gate width, and L denotes the gate width.

Figure 6:
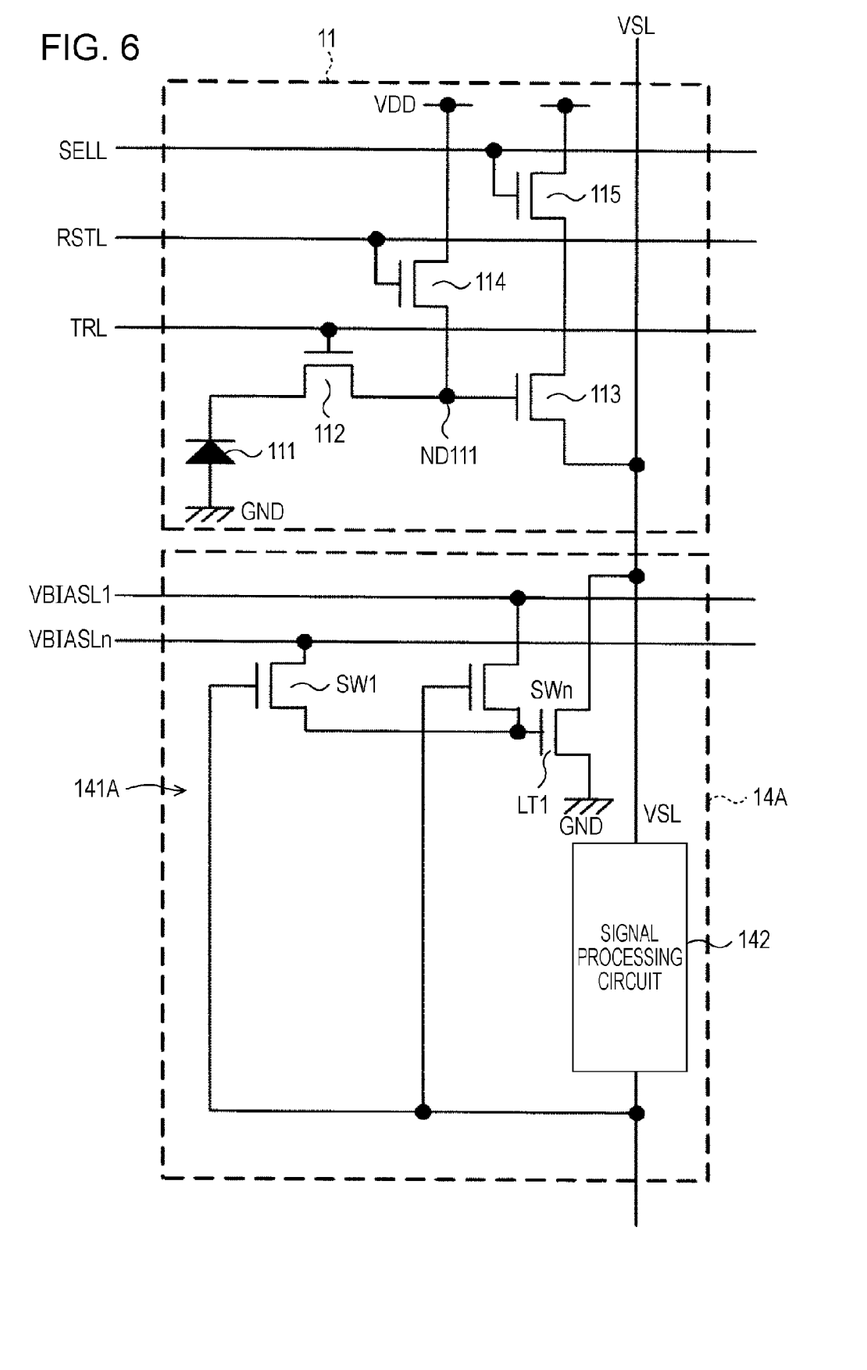
FIG. 6 is a diagram showing the structure of a pixel signal processing unit according to a modification of the embodiment of the present invention.

FIG. 6 illustrates the structure of a pixel signal processing unit according to a modification of the present embodiment of the present invention.

The difference between the pixel signal processing unit 14 in FIG. 4 and a pixel signal processing unit 14A in FIG. 6 is as follows: A current source 141A includes a single load MOS transistor LT1. A first MOS switch SW1 is connected between the gate of the load MOS transistor LT1 and a first bias-signal supply line VBIASL1. An nth MOS switch SWn is connected between the gate of the load MOS transistor LT1 and an nth bias-signal supply line VBIASLn. The turn-on and -off of the MOS switches SW1 to SWn are controlled using an output of the signal processing circuit 142.

Specifically, the pixel signal processing unit 14A in FIG. 6 selects any of a plurality of bias voltages as the gate voltage of the load MOS transistor LT1 in accordance with the output of the signal processing circuit 142. Any of the MOS switches (transistors) is selectively connected to exclusively select any of the bias voltages, thus changing the bias voltage. Consequently, the drive current amount of the load MOS transistor LT1 can be changed.

As described above, in the imaging apparatus 10 having the pixel signal processing unit 14 in FIG. 4 or 14A in FIG. 6, the drive current amount of at least one load MOS transistor LT is changed in accordance with a pixel output of the imaging apparatus or a pixel signal obtained by signal processing on the pixel output, so that an offset amount suitable for signal processing on the subsequent stage can be added to the pixel output.

Adding the offset can perform feedback such that the source follower circuit, composed of the amplifier transistor 113 in each unit pixel 11 and the load MOS transistor LT, can be used in a linear characteristic region.

Changing the offset can cancel out a variation caused by a manufacturing process, e.g., a variation in threshold voltage of the amplifier transistor 113 in each unit pixel 11.

According to the embodiments of the present invention, a high-resolution high-accuracy imaging apparatus capable of achieving high speed operation for realizing a high frame rate or processing an increased number of pixels without causing an increase in power consumption and requiring an improvement of the accuracy of elements can be realized.

A more concrete example of the structure of a pixel signal processing unit will now be described below.

Figure 7:
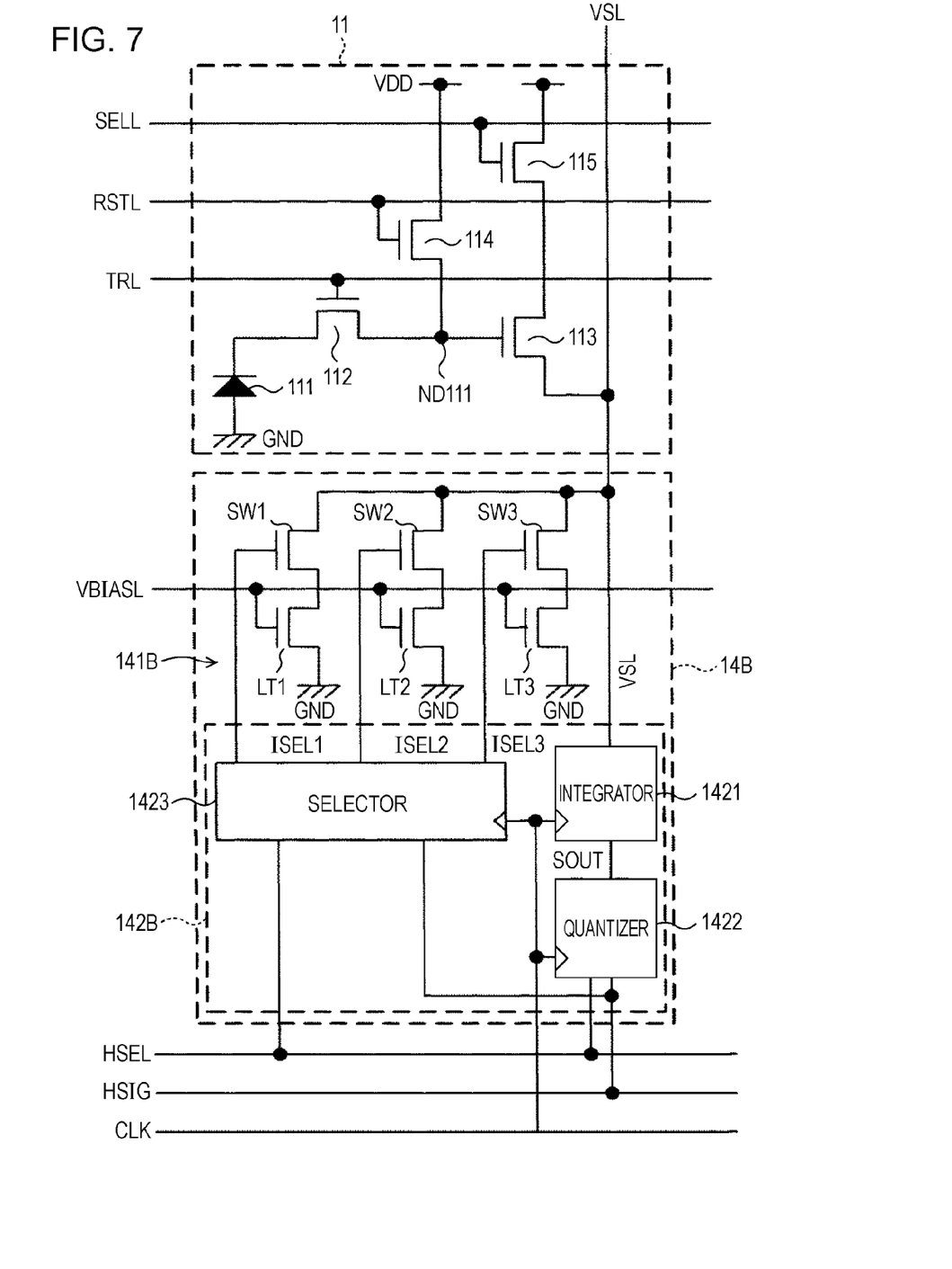
FIG. 7 is a diagram illustrating the structure of a unit pixel and that of a pixel signal processing unit according to a first concrete example of the embodiment of the present invention.

FIG. 7 illustrates of the structure of a unit pixel and that of a pixel signal processing unit according to a first concrete example in accordance with the present embodiment of the present invention.

Referring to FIG. 7, the structure of the unit pixel 11 is similar to those shown in FIGS. 4 and 6. The structure of a pixel signal processing unit 14B is made more concrete than those in FIGS. 4 and 6.

Specifically, referring to FIG. 7, a signal processing circuit includes a ΔΣ modulator 142B that includes an integrator 1421, a quantizer 1422, and a selector 1423.

The structure of a current source 141B is similar to that in FIG. 4. In FIG. 7, n=3. The current source 141B includes three load MOS transistors LT1 to LT3 and three MOS switches SW1 to SW3.

In the current source 141B, the gates of the load MOS transistors LT1 to LT3 are connected to the bias-signal supply line VBIASL through which the bias signal VBIAS is supplied. The load MOS transistors LT1 to LT3 each function as a constant current source.

The source of the load MOS transistor LT1 is connected to the reference potential (the ground potential GND in this embodiment) and the drain thereof is connected to the source of the MOS switch (MOS transistor) SW1. The drain of the MOS switch SW1 is connected to the pixel output signal line VSL.

Similarly, the source of the load MOS transistor LT2 is connected to the reference potential (the ground potential GND in the present embodiment) and the drain thereof is connected to the source of the MOS switch (MOS transistor) SW2. The drain of the MOS switch SW2 is connected to the pixel output signal line VSL.

Similarly, the source of the load MOS transistor LT3 is connected to the reference potential (the ground potential GND in the present embodiment) and the drain thereof is connected to the source of the MOS switch (MOS transistor) SW3. The drain of the MOS switch SW3 is connected to the pixel output signal line VSL.

The gate of the MOS switch SW1 is connected to a supply line for a selection control signal ISEL1 in the ΔΣ modulator 142B. The gate of the MOS switch SW2 is connected to a supply line for a selection control signal ISEL2 in the ΔΣ modulator 142B. The gate of the MOS switch SW3 is connected to a supply line for a selection control signal ISEL3 in the ΔΣ modulator 142B.

In the ΔΣ modulator 142B, the integrator 1421, the quantizer 1422, and the selector 1423 start operating in response to a high-level selection signal HSEL and operate synchronously with a clock signal CLK.

The integrator 1421 functions as an LPF and outputs a signal SOUT indicating the result of integration to the quantizer 1422.

The quantizer 1422 quantizes the signal SOUT output from the integrator 1421 using a predetermined threshold level VTHL and outputs a signal HSIG indicating the result of quantization to the selector 1423 and a decimation filter (not shown) in the subsequent stage.

When the level of the signal SOUT is higher than the threshold level VTHL, the quantizer 1422 sets the output signal HSIG to a value of "1". When the level of the signal SOUT is lower than the threshold level VTHL, the quantizer 1422 sets the output signal HSIG to a value of "0".

The selector 1423 sets the level of each of the selection control signals ISEL1 to ISEL3 in accordance with the value of the output signal HSIG of the quantizer 1422, the signals ISEL1 to ISEL3 being used for control of turn-on/off of the MOS switches SW1 to SW3 in the current source 141B.

Figure 8:
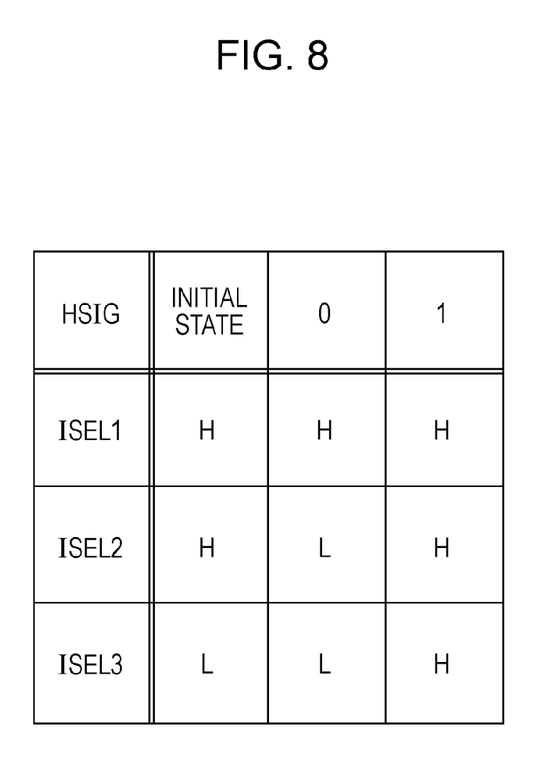
FIG. 8 is a diagram showing the relationship between outputs of a quantizer and set levels of selection control signals in a selector of a $\Delta\Sigma$ modulator in accordance with the embodiment.

FIG. 8 is a diagram showing the relationship between the outputs of the quantizer 1422 and set levels of the selection control signals in the selector 1423 in the ΔΣ modulator 142B according to the present embodiment.

In the present embodiment, in an initial state, the selector 1423 sets the two selection control signals ISEL1 and ISEL2 to a high level ("H") and sets the selection control signal ISEL3 to a low level ("L") as shown in FIG. 8.

In the initial state, the MOS switches SW1 and SW2 in the current source 141B turn on and the MOS switch SW3 turns off. Accordingly, the load MOS transistors LT1 and LT2 are connected in parallel to the pixel output signal line VSL, so that the two current sources are connected to the amplifier transistor 113 in the unit pixel to constitute a source follower. In other words, in the initial state, the selector 1423 selects and controls the load MOS transistors so as to obtain the drive current amount of two transistors.

Referring to FIG. 8, when the output of the quantizer 1422 indicates "1", the selector 1423 sets the three selection control signal ISEL1 to ISEL3 to the high level ("H").

When the output of the quantizer 1422 indicates "1", the MOS switches SW1 to SW3 turn on in the current source 141B. Accordingly, the load MOS transistors LT1 to LT3 are connected in parallel to the pixel output signal line VSL, so that the three current sources are connected to the amplifier transistor 113 in the unit pixel to constitute a source follower. In other words, when the output of the quantizer 1422 indicates "1", the selector 1423 selects and controls the load MOS transistors so as to obtain the drive current amount of three transistors.

Referring to FIG. 8, when the output of the quantizer 1422 indicates "0", the selector 1423 sets the selection control signal ISEL1 to the high level ("H") and sets the two selection control signals ISEL2 and SEL3 to the low level ("L").

When the output of the quantizer 1422 indicates "0", the MOS switch SW1 turns on and the MOS switches SW2 and SW3 turn off in the current source 141B. Accordingly, the load MOS transistor LT1 is connected in parallel to the pixel output signal line VSL, so that the single current source is connected to the amplifier transistor 113 in the unit pixel to constitute a source follower. In other words, when the output of the quantizer 1422 indicates "0", the selector 1423 selects and controls the load MOS transistors so as to obtain the drive current amount of one transistor.

In the pixel signal processing unit 14B with the above-described structure, an output from the pixel output signal line VSL is supplied to the integrator 1421 constituting the ΔΣ modulator 142B. The signal SOUT output from the integrator 1421 is supplied to the quantizer 1422. A pixel output signal obtained by quantization through the quantizer 1422 is supplied as the signal HSIG to the decimation filter in the subsequent stage and is also fed back to the selector 1423 to control the drive current amount of the load MOS transistors. This arrangement achieves a ΔΣ analog-to-digital converter.

Figure 10:
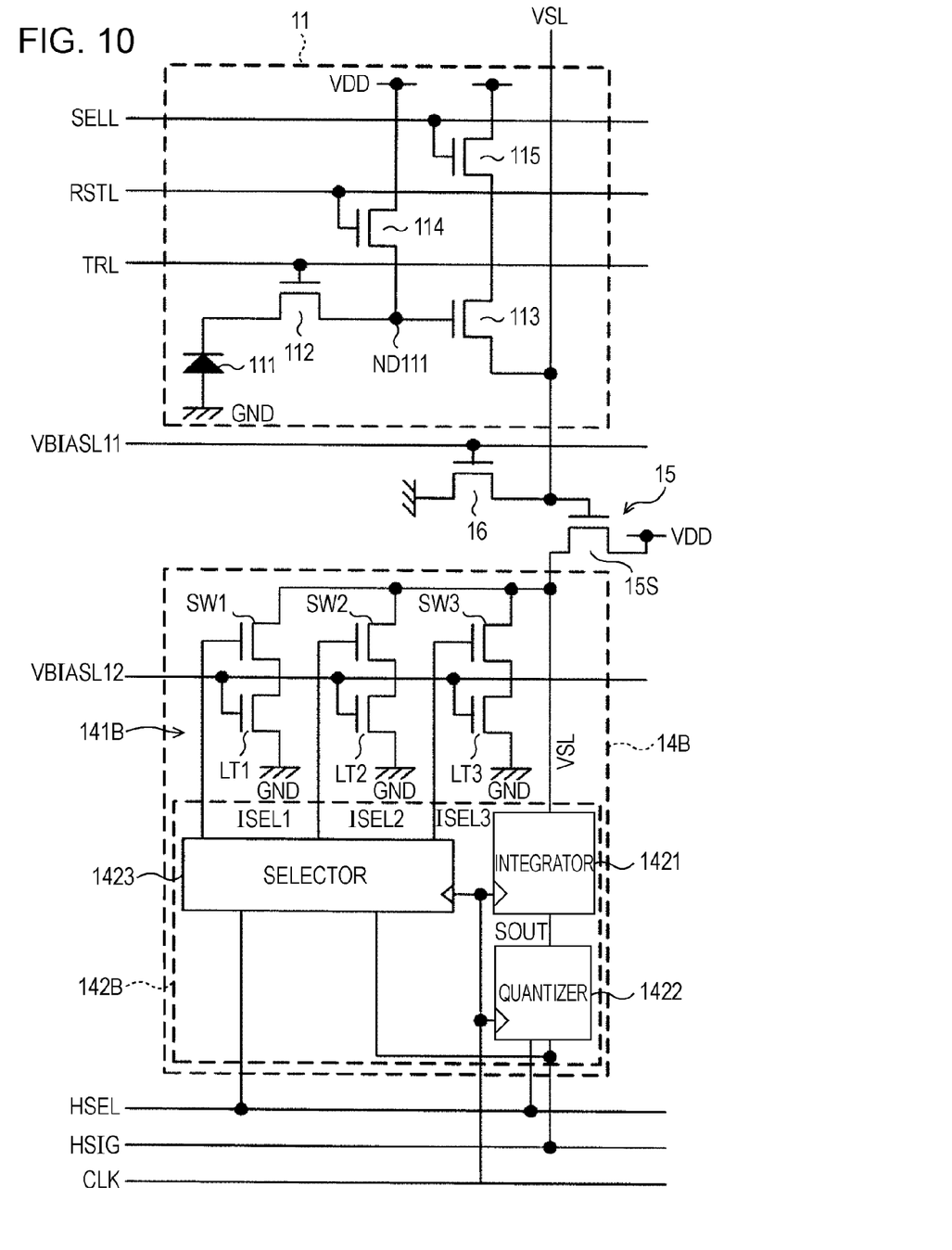
FIG. 10 is a diagram illustrating the structure of a unit pixel and that of a pixel signal processing unit according to a second concrete example of the embodiment of the present invention.

FIG. 10 is a timing chart explaining the operation of the pixel signal processing unit 14B in FIG. 7.

Figure 9:
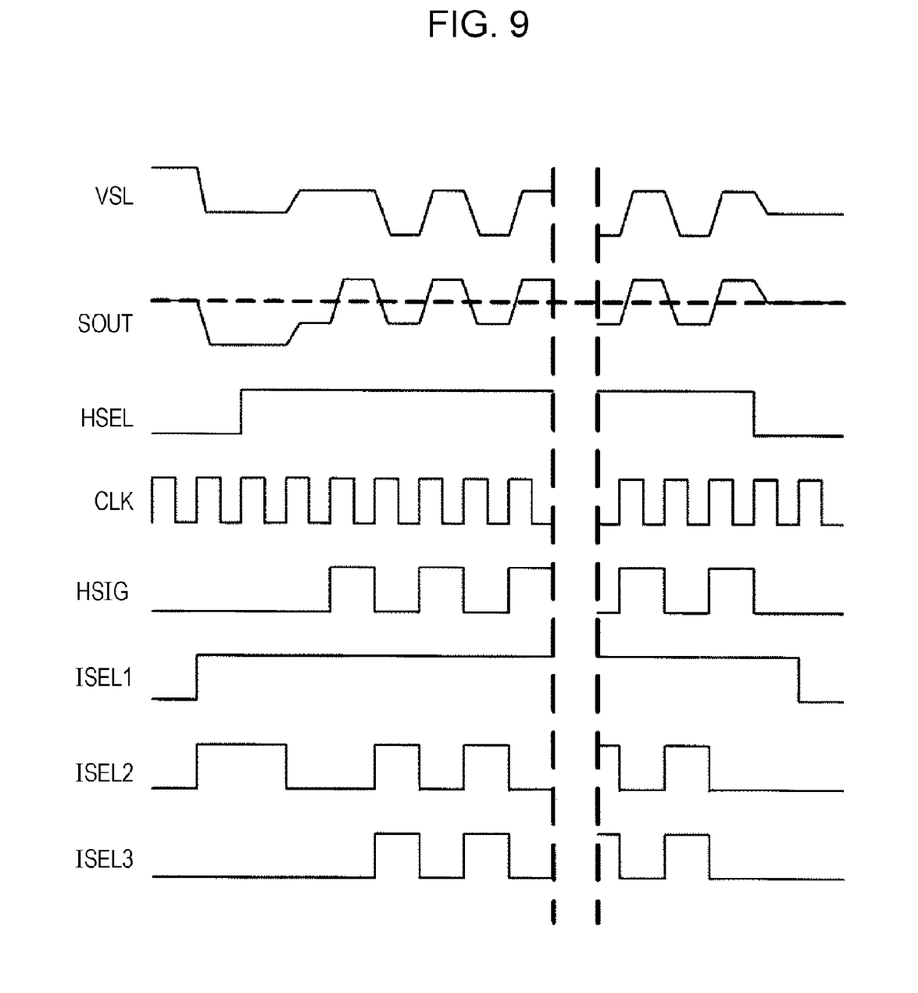
FIG. 9 is a timing chart explaining the operation of the pixel signal processing unit in FIG. 7.

In the initial state before the selection signal HSEL becomes high, the selector 1423 sets the two selection control signals ISEL1 and ISEL2 to the high level ("H") and sets the selection control signal ISEL1 to the low level ("L"). Consequently, the MOS switches SW1 and SW2 turn on and the MOS switch SW3 turns off in the current source 141B. In other words, in the initial state, the selector 1423 selects and controls the load MOS transistors so as to obtain the drive current amount of two transistors.

In this instance, when the selection signal HSEL becomes high, the integrator 1421, the quantizer 1422, and the selector 1423 start operating. The output signal HSIG of the quantizer 1422 varies in response to the output signal SOUT of the integrator 1421 (a dashed line at "SOUT" in FIG. 9 denotes the threshold level VTHL of the quantizer 1422).

When receiving the signal HSIG indicating, for example, "1" from the quantizer 1422, the selector 1423 sets the three selection control signals ISEL1 to ISEL3 to the high level "H" in the next clock cycle to lower the level of the pixel output signal line VSL. Consequently, the MOS switches SW1 to SW3 turn on in the current source 141B. In other words, when the output of the quantizer 1422 indicates "1", the selector 1423 selects and controls the load MOS transistors so as to obtain the drive current amount of three transistors.

On the other hand, when the output signal HSIG of the quantizer 1422 indicates "0", the selector 1423 sets only the selection control signal ISEL1 to the high level ("H") so as to raise the level of the pixel output signal line VSL. Consequently, only the MOS switch SW1 turns on in the current source 141B. In other words, when the output of the quantizer 1422 indicates "0", the selector 1423 selects and controls the load MOS transistors so as to obtain the drive current amount of one transistor.

The above-described feedback achieves the ΔΣ analog-to-digital converter.

As described above, the arrangement in FIG. 7 can achieve a ΔΣ analog-to-digital converter. Advantageously, a solid-state imaging apparatus having column-parallel high-accuracy analog-to-digital converters can be realized.

In the example of FIG. 7, the first-order integrator and the 1-bit quantizer are used. The number of selectors and the number of load MOS transistors to be controlled may be changed in accordance with the order of the integrator and the number of bits of the quantizer. The integrator may have either switched-capacitor circuitry or RC circuitry.

FIG. 10 illustrates of the structure of a unit pixel and that of a pixel signal processing unit according to a second concrete example in accordance with the present embodiment of the present invention.

The difference between the first and second examples in FIGS. 7 and 10 is that the output of the pixel output signal line VSL is temporarily supplied to a source follower 15S including a MOS transistor 15, serving as part of another transmission path, and the source follower 15S is connected to the current source 141B so that the drive current amount of load MOS transistors flowing to the MOS transistor 15 is changed.

Specifically, the source of the MOS transistor 15 is connected to each of the drains of MOS transistors, constituting the MOS switches SW1 to SW3 in the current source 141B. The drain of the MOS transistor 15 is connected to the power supply voltage source VDD and the gate thereof is connected to the pixel output signal line VSL. In addition, the drain of a MOS transistor 16, serving as a current source, is connected to the pixel output signal line VSL and the gate of the MOS transistor 15. The source of the MOS transistor 16 is connected to the reference potential (the ground potential GND in the present embodiment) and the gate thereof is connected to a bias-signal supply line VBIASL11.

The gates of the load MOS transistors LT1 to LT3 in the current source 141B are connected to a bias-signal supply line VBIASL12.

The reason why the above-described structures are used is as follows.

Since each pixel output signal line VSL is generally arranged in the vertical direction (along the columns) of the pixel array 12, many unit pixels 11 are connected to each pixel output signal line VSL.

Accordingly, the pixel output signal line VSL has a parasitic capacitance of several picofarads in some cases. When the drive current amount of the load MOS transistors shown in FIG. 4, 6, or 7 is changed, the settling characteristics of a source follower output may be deteriorated.

To prevent the deterioration, the output of the pixel output signal line VSL is temporarily supplied to the source follower 15S and the drive current amount of the load MOS transistors to the source follower 15S is changed, thus achieving the above-described feedback.

The arrangement shown in FIG. 10 can achieve a ΔΣ analog-to-digital converter even in a solid-state imaging apparatus in which parasitic elements are connected to each pixel output signal line VSL. Advantageously, a solid-state imaging apparatus having column-parallel high-accuracy analog-to-digital converters can be achieved.

The imaging apparatus 10 having the above-described advantages can be used as a solid-state imaging apparatus included in a digital camera or a video camera.

Figure 11:
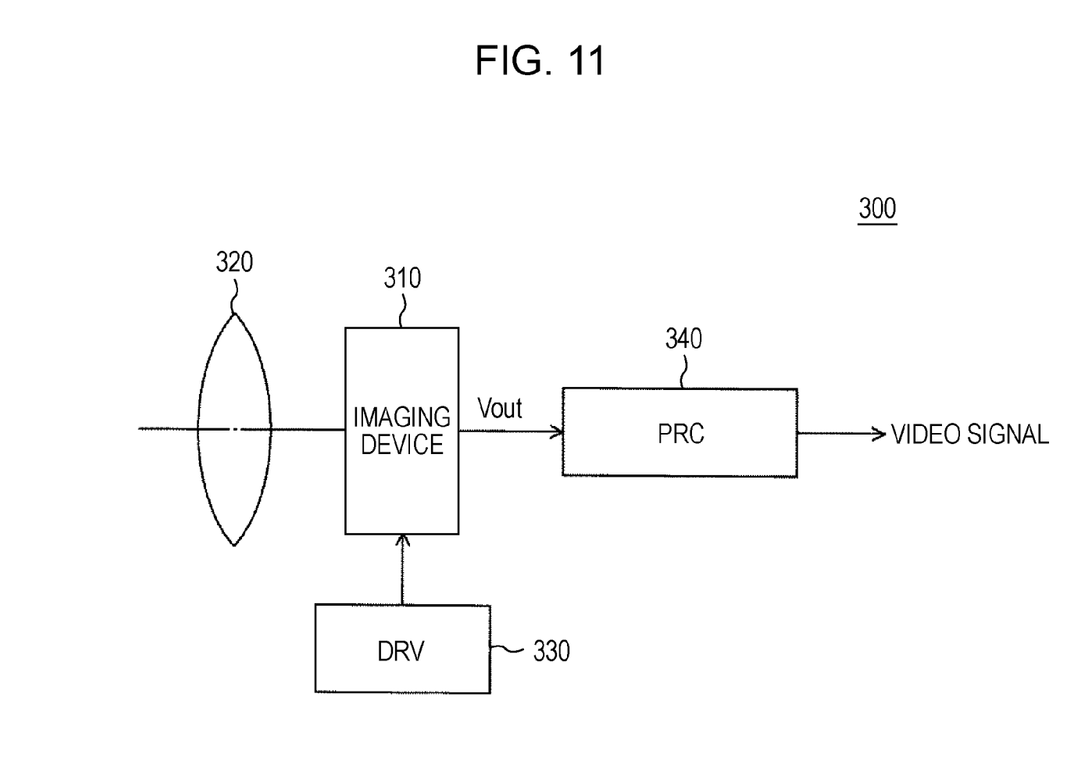
FIG. 11 is a diagram illustrating the structure of a camera system including the imaging apparatus according to the embodiment of the present invention.

FIG. 11 illustrates the structure of a camera system to which the imaging apparatus according to the present embodiment of the present embodiment is applied.

Referring to FIG. 11, the camera system 300 includes an imaging device 310, an optical system for allowing incident light to enter a pixel area of the imaging device 310 (forming a subject image in the pixel area), e.g., a lens 320 for focusing incident light (image light) onto the imaging surface of the imaging device 310, a drive circuit (DRV) 330 for driving the imaging device 310, and an image processor (PRC) 340 for processing an output signal of the imaging device 310.

The above-described imaging apparatus 10 can be used as the imaging device 310 in FIG. 11.

The drive circuit 330 includes a timing generator (not shown) for generating various timing signals, such as a start pulse and a clock pulse, used for driving a horizontal shift register and a vertical shift register and drives the imaging device 310 using predetermined timing signals.

The present camera system 300 can obtain the same advantages as those in the above-described embodiment. Advantageously, a high-resolution high-accuracy camera capable of achieving high speed operation for realizing a high frame rate or processing an increased number of pixels without causing an increase in power consumption and requiring an improvement of the accuracy of elements can be achieved.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   a pixel that outputs signal charge as a pixel signal, the signal charge being obtained by imaging;
   a current source connected to a transmission path for the pixel signal, the current source having a variable current; and
   a signal processing circuit that performs signal processing on the pixel signal and performs control so that the current of the current source is changed in accordance with a result of the signal processing,
   wherein,
   the signal processing circuit comprises:
      an integrator that integrates the pixel signal transmitted through the transmission path;
      a quantizer that quantizes an output signal of the integrator; and
      a selector that changes the current of the current source in accordance with a result of the quantization by the quantizer.

2. An imaging apparatus comprising:
   a pixel that outputs signal charge as a pixel signal, the signal charge being obtained by imaging;
   a current source connected to a transmission path for the pixel signal, the current source having a variable current; and
   a signal processing circuit that performs signal processing on the pixel signal and performs control so that the current of the current source is changed in accordance with a result of the signal processing,
   wherein,
   the pixel includes an amplifier transistor constituting a source follower that outputs the signal charge as the pixel signal to the transmission path,
   the current source includes a plurality of load transistors and a plurality of switches, gates of the load transistors being biased using a predetermined bias signal, sources of the load transistors being connected in parallel to a predetermined potential, each switch being connected between a drain of a corresponding load transistor and the transmission path,
   the signal processing circuit selectively turns on the plurality of switches in the current source in accordance with a result of the processing the pixel signal transmitted through the transmission path, and
   the signal processing circuit comprises (a) an integrator that integrates the pixel signal transmitted through the transmission path, (b) a quantizer that quantizes an output signal of the integrator and (c) a selector that selectively turns on the plurality of switches in the current source in accordance with a result of the quantization by the quantizer.

3. An imaging apparatus comprising:
   a pixel that outputs signal charge as a pixel signal, the signal charge being obtained by imaging;
   a current source connected to a transmission path for the pixel signal, the current source having a variable current; and
   a signal processing circuit that performs signal processing on the pixel signal and performs control so that the current of the current source is changed in accordance with a result of signal processing, wherein, the pixel includes an amplifier transistor constituting a source follower that outputs the signal charge as the pixel signal to the transmission path, the current source includes a load transistor and a plurality of switches, a source of the load transistor being connected to a predetermined potential, the switches being connected to a gate of the load transistor and being connected to different bias-signal supply lines, respectively, the signal processing circuit selectively turns on the plurality of switches in the current source in accordance with a result of processing on the pixel signal transmitted through the transmission path, and the signal processing circuit comprises (a) an integrator that integrates the pixel signal transmitted through the transmission path, (b) a quantizer that quantizes an output signal of the integrator and (c) a selector that selectively turns on the plurality of switches in the current source in accordance with a result of the quantization by the quantizer.

4. An imaging apparatus comprising:

a pixel that outputs signal charge as a pixel signal, the signal charge being obtained by imaging;

a current source connected to a transmission path for the pixel signal, the current source having a variable current; and a signal processing circuit that performs signal processing on the pixel signal and performs control so that the current of the current source is changed in accordance with a result of the signal processing, wherein, the signal processing circuit includes an integrator, a quantizer, and a selector, the quantizer compares a level of an integrated signal obtained by the integrator with a threshold level and outputs a result of the comparison to the selector, and the selector changes the current of the current source so that when the level of the integrated signal is higher than the threshold level, a level of the transmission path is lowered, and when the level of the integrated signal is lower than the threshold level, the level of the transmission path is raised.

5. An imaging apparatus comprising:

a pixel that outputs signal charge as a pixel signal, the signal charge being obtained by imaging;

a current source connected to a transmission path for the pixel signal, the current source having a variable current; and a signal processing circuit that performs signal processing on the pixel signal and performs control so that the current of the current source is changed in accordance with a result of the signal processing, wherein, the pixel includes an amplifier transistor constituting a source follower that outputs the signal charge as the pixel signal to the transmission path, the current source includes a plurality of load transistors and a plurality of switches, gates of the load transistors being biased using a predetermined bias signal, sources of the load transistors being connected in parallel to a predetermined potential, each switch being connected between a drain of a corresponding load transistor and the transmission path, the signal processing circuit selectively turns on the switches in the current source in accordance with a result of processing on the pixel signal transmitted through the transmission path, the signal processing circuit includes an integrator, a quantizer, and a selector, the quantizer compares a level of an integrated signal obtained by the integrator with a threshold level and outputs a result of the comparison to the selector, and the selector selectively turns on the switches in the current source so that when the level of the integrated signal is higher than the threshold level, a level of the transmission path is lowered, and when the level of the integrated signal is lower than the threshold level, the level of the transmission path is raised.

6. An imaging apparatus comprising:

a pixel that outputs signal charge as a pixel signal, the signal charge being obtained by imaging;

a current source connected to a transmission path for the pixel signal, the current source having a variable current; and a signal processing circuit that performs signal processing on the pixel signal and performs control so that the current of the current source is changed in accordance with a result of the signal processing, wherein, the pixel includes an amplifier transistor constituting a source follower that outputs the signal charge as the pixel signal to the transmission path, and the current source includes a load transistor and a plurality of switches, a source of the load transistor being connected to a predetermined potential, the plurality of switches being connected to a gate of the load transistor and being connected to different bias-signal supply lines, respectively, the signal processing circuit selectively turns on the plurality of switches in the current source in accordance with a result of processing on the pixel signal transmitted through the transmission path, the signal processing circuit includes an integrator, a quantizer, and a selector, the quantizer compares the level of an integrated signal obtained by the integrator with a threshold level and outputs a result of the comparison to the selector, and the selector selectively turns on the plurality of switches in the current source so that when the level of the integrated signal is higher than the threshold level, a level of the transmission path is lowered, and when the level of the integrated signal is lower than the threshold level, the level of the transmission path is raised.

7. An imaging apparatus comprising:

a pixel that outputs signal charge as a pixel signal, the signal charge being obtained by imaging;

a current source connected to a transmission path for the pixel signal, the current source having a variable current; and a signal processing circuit that performs signal processing on the pixel signal and performs control so that the current of the current source is changed in accordance with a result of signal processing, wherein, the signal processing circuit includes at least (a) an integrator that integrates the pixel signal transmitted through the transmission path, and (b) a quantizer that quantizes an output signal of the integrator, and the transmission path includes a pixel output signal line that is connected to a source of the amplifier transistor in the pixel and is connected to the current source.

8. An imaging apparatus comprising:

a pixel that outputs signal charge as a pixel signal, the signal charge being obtained by imaging;

a current source connected to a transmission path for the pixel signal, the current source having a variable current; and a signal processing circuit that performs signal processing on the pixel signal and performs control so that the current of the current source is changed in accordance with a result of the signal processing, wherein, the transmission path includes (a) a pixel output signal line connected to the source of the amplifier transistor in the pixel and (b) a source follower transistor, the gate of the source follower transistor being connected to the pixel output signal line, the source thereof being connected to the current source.

9. An imaging apparatus comprising:

a pixel array including a plurality of pixels arranged in a matrix, each pixel outputting signal charge as a pixel signal, the signal charge being obtained by imaging; and a plurality of pixel signal processing units arranged for respective columns of the pixel array, wherein, each pixel signal processing unit includes (a) a current source connected to a transmission path for the pixel signal, the current source having a variable current and (b) a signal processing circuit that performs signal processing on the pixel signal and performs control so that the current of the current source is changed in accordance with a result of the signal processing, and the signal processing circuit comprises (a) an integrator that integrates the pixel signal transmitted through the transmission path, (b) a quantizer that quantizes an output signal of the integrator and (c) a selector that changes the current of the current source in accordance with a result of the quantization by the quantizer.

10. The apparatus according to claim 9, wherein:

the quantizer compares a level of an integrated signal obtained by the integrator with a threshold level and outputs a result of comparison to the selector, and the selector changes the current of the current source so that when the level of the integrated signal is higher than the threshold level, a level of the transmission path is lowered, and when the level of the integrated signal is lower than the threshold level, the level of the transmission path is raised.

11. The apparatus according to claim 10, wherein the transmission path includes a pixel output signal line that is connected to a source of an amplifier transistor in the pixel and is connected to the current source.

12. The apparatus according to claim 10, wherein the transmission path includes:

a pixel output signal line connected to a source of an amplifier transistor in the pixel; and a source follower transistor having (a) a gate connected to the pixel output signal line, and (b) a source connected to the current source.

* * * * *